United States Patent [19]

Weigert

[11] Patent Number: 5,629,570

[45] Date of Patent: May 13, 1997

[54] PAINT FLOW CONTROL INTERFACE

[75] Inventor: Norman J. Weigert, Whitby, Canada

[73] Assignee: General Motors Corporation, Detroit, Mich.

[21] Appl. No.: 574,974

[22] Filed: Dec. 19, 1995

[51] Int. Cl.[6] ........................................ G05B 13/02
[52] U.S. Cl. ..................... 307/118; 239/63; 239/64; 239/65; 239/66; 239/67; 239/68; 361/54; 361/55
[58] Field of Search ........................ 307/118, 326; 364/510, 509; 239/63–68; 118/644, 645, 649, 659; 361/55, 54

[56] References Cited

U.S. PATENT DOCUMENTS

| 4,487,367 | 12/1984 | Perry et al. | |
|---|---|---|---|
| 4,494,064 | 1/1985 | Harkness | 323/277 |
| 4,614,300 | 9/1986 | Falcoff | 239/71 |
| 4,922,952 | 5/1990 | Sasaki | 364/510 |
| 5,102,045 | 4/1992 | Diana | 239/3 |
| 5,182,704 | 1/1993 | Bengtsson | 364/148 |
| 5,189,697 | 2/1993 | Das et al. | 379/413 |

*Primary Examiner*—David S. Martin
*Assistant Examiner*—Albert W. Paladini
*Attorney, Agent, or Firm*—Michael J. Bridges

[57] ABSTRACT

Paint flow control interface circuitry for passing electrical signals across a paint booth barrier including a feedback signal indicating a paint flow parameter from a parameter transducer within the paint booth, includes passive resistive intrinsically safe barrier circuit elements coupled with buffer circuitry for minimizing the voltage drop across the interface circuitry. Light filtering of the buffer circuitry output signal with minimum filter lag yields an accurate indication of the paint flow parameter with high signal to noise ratio and minimum signal lag, for application in closed-loop paint flow control. Additional transducer voltage supply signal feedback provides for closed-loop voltage supply control across the interface circuit.

11 Claims, 3 Drawing Sheets

PAINT FLOW CONTROL INTERFACE

FIELD OF THE INVENTION

This invention relates to automotive paint flow control and, more particularly, to an interface circuit between paint flow sensing hardware and a paint flow controller.

BACKGROUND OF THE INVENTION

Electrical signals passing across an automotive paint booth barrier may require conditioning by intrinsically safe barrier ISB circuitry for electrical power limiting in the booth. When signal accuracy is critical, transformer isolated ISBs are conventionally required. Transformer isolated ISBs use well-known switching technology to transfer signals across the barrier. The switching technology injects significant noise into the signals passing across the ISB. Heavy filtering is required to reduce the noise, for example using a lag filter process with a long filter time constant. The long filter time constant of such a filter process adds significant time lag to the signal, reducing signal accuracy during transients. Such a filtered signal may be used only when steady state signal information is sufficient. In applications requiring signal accuracy during transient conditions, such as conditions characterized by a substantial time rate of change in the signal magnitude, such heavy filtering is unacceptable. Therefore, transformer-based ISBs, or indeed any barrier circuitry that significantly corrupts signals passing across booth barriers is unacceptable in such applications.

It has been proposed to provide a potentiometer-based paint flow volume feedback signal in a paint flow control system, wherein a potentiometer wiper position varies with variation in a paint control volume, and wherein the potentiometer output signal indicating the wiper position at any time during a paint control process is passed across a paint booth barrier to a paint flow controller. The feedback signal may then be used to dynamically vary control parameters for closed-loop paint flow control. If precision in paint flow control is desired, the feedback signal must accurately indicate paint flow volume throughout the control process. Traditional guidelines suggest that such a precision feedback signal must pass across a transformer based ISB. However, the dynamic control of such systems requires a responsive potentiometer wiper position indication, which preempts use of the heavy filtering required with the transformer based ISBs.

Accordingly, what is needed is intrinsically safe barrier circuitry having high accuracy and minimum signal lag across a paint booth barrier.

SUMMARY OF THE INVENTION

The present invention is a departure from conventional ISB requirements, providing an interface circuit including an intrinsically safe barrier circuit injecting minimum noise into signals passing across a paint booth barrier and adding virtually no signal lag across the barrier.

More specifically, the conventional requirement of a transformer based ISB for high accuracy applications is departed from strikingly through application of simple passive, resistive intrinsically safe barrier ISB circuitry in an interface circuit for passing electrical signals across a paint booth barrier. Substantially lag-free buffer filter circuitry buffers the signal output by such ISB to minimize the voltage drop across the interface circuit, yielding a substantially lag-free, voltage drop-free output signal provided to a controller outside the paint booth. Simple low pass filtering of the buffered signal with a small filter time constant may be provided in accord with a further aspect of this invention to yield a remarkable improvement in signal quality across the interface circuitry, with high signal to noise ratio and minimum signal time lag. Up to date signal information is then available throughout a paint flow control process acceptable for use in both steady state and transient control operations with minimum noise corruption.

In accord with a further aspect of this invention, in a paint flow controller responsive to a paint volume feedback signal provided, for example, by a potentiometer in the paint booth, the potentiometer supply voltage signal may be precisely controlled via closed-loop voltage regulation. A supply voltage regulator may provide, as its output signal, a potentiometer supply voltage which is passed to the potentiometer in the paint booth via a passive, resistive ISB. The supply voltage may be fed back to the regulator via a feedback ISB, which itself may be in the form of a passive, resistive ISB. The regulator may then vary its output signal in direction to minimize the difference between the output of the feedback ISB and a target voltage. Still further, the potentiometer reference voltage may be passed to the potentiometer via a passive resistive ISB.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
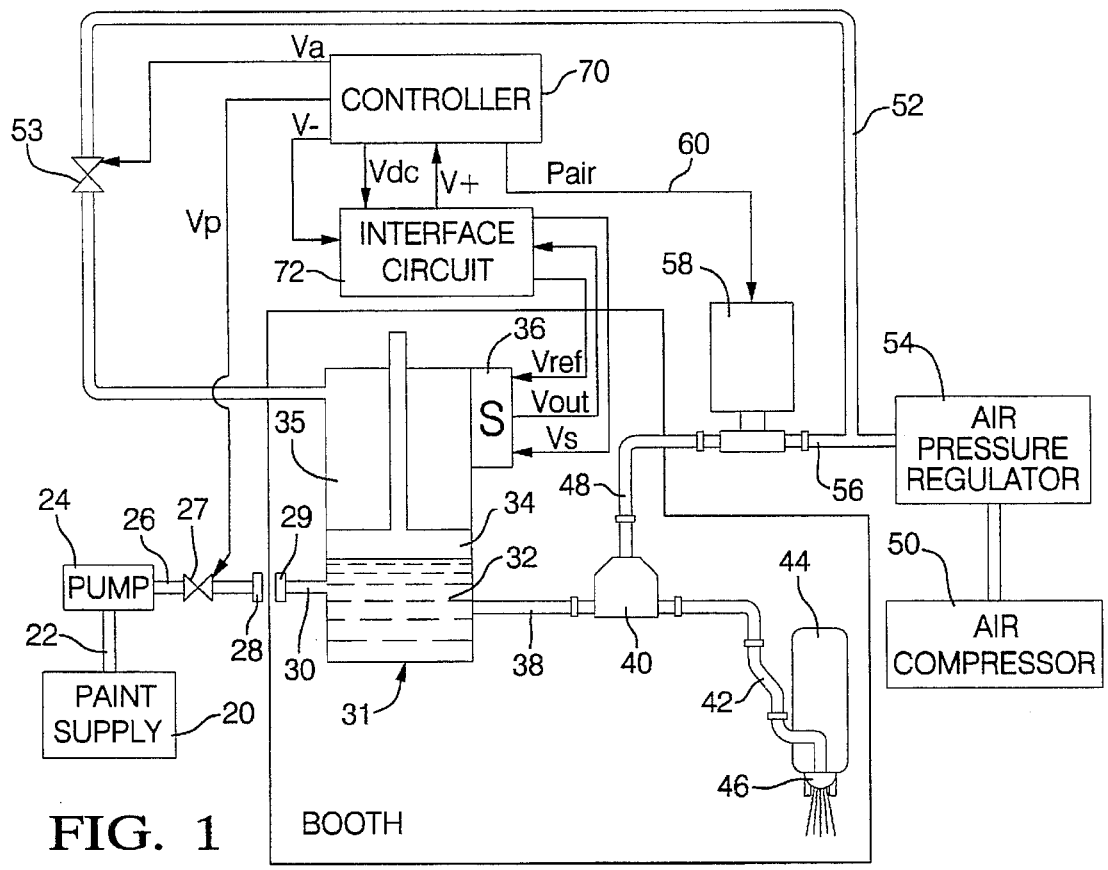
FIG. 1 is a general schematic diagram of paint flow control hardware of the preferred embodiment of this invention.

Referring to FIG. 1, in an automotive paint flow control system including paint supply 20, paint is drawn from the supply 20 through supply line 22 via action of pump 24 for passing pressurized paint through conduit 26 to flow control valve 27, such as an electrically controlled binary flow control valve, responsive to control signal Vp applied thereto. Paint passing through valve 27 applicator interface 28 which takes the form of a conventional receptacle on a paint booth 10 wall that may be accessed during a conventional paint flow control procedure, such as that of U.S. Pat. No. 4,785,760, wherein a robot manipulated paint applicator may be controlled to position a conduit 30 having a terminal 29 on an end thereof within the interface 28 to allow for paint flow across the interface through conduit 30 to a cylinder 31 having a piston 34. The paint is received in the cylinder 31 on a first side of the piston 34 and pressurized air 35 is received on a second side, opposing the first side, of the piston. The piston 34 is linearly displaced in the cylinder 31 in proportion to the volume of paint admitted to the cylinder 31. The piston displacement is transduced by conventional transducer S 36, which may take the form of a conventional linear potentiometer, magnetically coupled to the piston 34 and fixed in position relative to the cylinder 31. The transducer S 36 is biased by supply voltage input signal Vs, a reference voltage input signal Vref, and provides output signal Vout the magnitude of which indicates the degree of displacement of the piston away from an initialization position, and thus is proportional to the volume of paint 32 in the cylinder 31. The signals Vs, Vref, and Vout are passed across the paint booth barrier via interface circuit 72, to be described. The interface circuit 72 receives input signals from controller 70, including a supply voltage signal Vdc and a reference voltage signal V−, for example from a ground reference. The controller 70 takes the form of a conventional paint flow controller, such as the commercially available Fanuc Robotics RJ Series controller for P155 robots.

Air compressor 50 delivers a pressurized supply of air, the pressure of which is regulated by conventional air pressure regulator 54, as described. The regulator output pressure is approximately 90 p.s.i. in this embodiment and is passed, via conduit 52 to binary pneumatic valve 53, such as a conventional solenoid valve controlled to a fully closed or a fully open position in response to valve control signal Va, output by controller 70. The valve opens into cylinder 31 on the described second side of the piston 34, for driving the piston in direction to reduce the volume of paint in cylinder 31 by forcing such supply of paint 32 through output conduit 38 to flow regulator 40.

Returning to the regulator 54, the regulator also outputs pressurized air to conduit 56 to pass to pressure controller 58 which, in this embodiment, takes the form of a standard SAMES current to pressure transducer for passing air therethrough to conduit 48 at a pressure controlled to be a function of transducer input signal Pair, provided as a control signal from controller 70. The conduit 48 passes the pressurized air to flow regulator 40, which provides for admission of paint to applicator conduit 42 at a pressure proportional to the pressure of the air in conduit 48, for example through a diaphragm configuration for pressure ratio control, as is generally understood in the art.

The pressure of paint flow passing through applicator conduit 42 directly corresponds to the paint flow rate therethrough to applicator head 44 having output gun 46, wherein the applicator head is a SAMES TRP500 air atomizing applicator head which delivers, via gun 46 paint to automotive parts in this embodiment.

To initiate a control process, controller 70 issues an air control valve command Va to valve 53 sufficient to close valve 53, and issues a paint control valve command Vp to valve 27 sufficient to open the valve 27 to allow for a filling of the cylinder 31 with paint. Following a filling of the cylinder 31, the valve 53 is opened and the valve 27 is closed, wherein pneumatic pressure is applied to the piston 34 forcing the piston in a direction reducing the paint volume 32 in the cylinder 31. The controller 70 then issues a control command Pair to transducer 58 for applying a control pressure to flow regulator 40 for delivering the paint from the cylinder to the applicator head assembly and to the automotive part (not shown) being painted.

Electrical signals passing across the barrier of paint booth 10 must be regulated to limit electrical power present in the booth 10, as is generally recognized in the art. Accordingly, all such signals are passed through interface circuit 72 designed, in accord with this invention, to provide for such regulation in a manner preserving signal accuracy under all system operating conditions, including transient operating conditions in which signals may be rapidly changing with respect to time. Such interface circuit in accord with this embodiment of the invention is presented in general form in FIG. 2, providing, for each signal passing across the barrier of the booth 10 (FIG. 1), an intrinsically safe barrier ISB component and, for each such signal requiring a great degree of signal accuracy under all operating conditions, such as is the case for the signal Vout of FIG. 1, noise elimination and amplification circuitry that maintains signal level and introduces minimum lag into signals.

Figure 2:
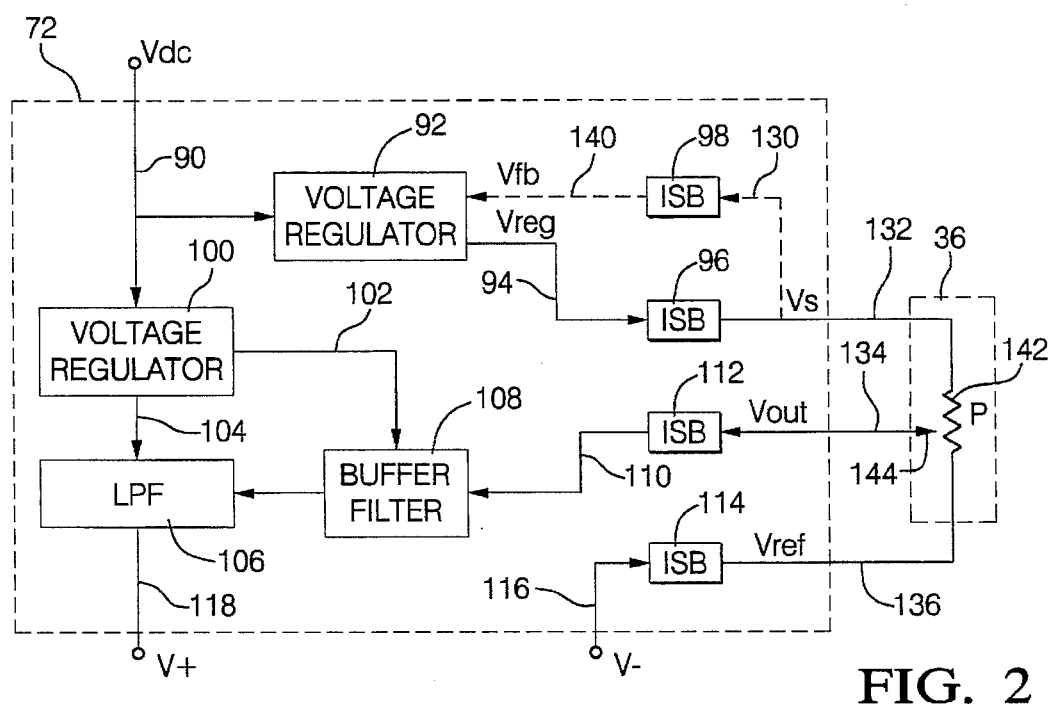
FIG. 2 is a block diagram of interface circuit components of the interface circuit of FIG. 1.

More specifically, as generally schematically illustrated in FIG. 2, transducer 36 is of the potentiometric type, having variable resistive element 142 with wiper arm 144 moving with the piston 34 (FIG. 1) and electrically connected to a conductor 134 carrying output signal Vout. An upper regulated voltage reference level Vs, such as about ten volts d.c. in this embodiment, is applied to a first end of the resistive element 142 on line 132. A lower reference voltage Vref, such as at a ground reference level, is applied at a second end of the resistive element opposing the first end thereof on line 136.

The signals Vref, Vs, and Vout must pass in this embodiment across the barrier of the paint booth 10 (FIG. 1), and therefore pass to signal conditioning or regulating circuitry in the form of a passive resistive type ISB 114, 96, and 112, respectively, to limit electrical power in the booth 10 (FIG. 1), as described. The passive resistive type ISB 136, 134, and 132 is of a single design in this embodiment, such as corresponding to commercially available Safe Snap single channel Stahl or Pepper+Fuchs Zener barriers, Z7 or Z8 series. Any variety of conventional passive, resistive ISB circuitry which introduces minimum noise into signals passing therethrough may be provided for any one of the ISBs 136, 134, or 132. The ISB of this embodiment is illustrated schematically in FIG. 4, comprising series resistor R3 of about 120 ohms, in series with conventional fuse F1, rated on the order of fifty to 250 milliamperes, selected according to operating constraints. The side of F1 opposing that connected to R3 is pulled to a ground voltage reference via each of conventional Zener diodes D1 and D2, rated at a nominal voltage of about twelve volts. A first ISB terminal 112 on a side of resistor R3 opposing the fuse F1 is electrically connected to the circuitry outside the booth 10 of FIG. 1, and a second ISB terminal 114 on a side of F1 opposing R3 is connected to the transducer 36 circuitry within the booth 10 of FIG. 1.

Returning to FIG. 2, a supply voltage Vdc, such as from a regulated source (not shown) is applied to the interface circuit 72 on line 90 to input terminal of voltage regulator 92, part number LM317, having regulated output signal adjusted in accord with the voltage drop across ISB1 96 so that signal Vs applied to the transducer 36 is maintained at ten volts d.c. The regulated output signal is applied to line 94, connected to the first ISB terminal of ISB 96. The second ISB terminal then carries a supply voltage signal Vs conditioned to ten volts for application in the booth 10 on the described line 132.

Figure 4:
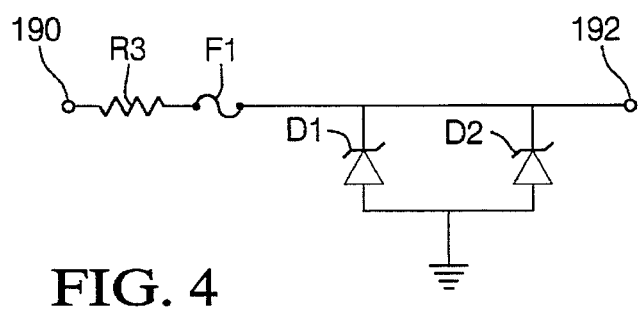
FIG. 4 is a schematic of the ISB contained in FIG. 3.

In an alternative embodiment of this invention, feedback signal on broken line 130 may pass the voltage level of signal Vs from within the booth 10 back across the barrier to the interface circuit 72 in the form of a voltage supply feedback signal to ISB element 98 which may take the form of the ISB of the described FIG. 4. The ISB 98 output signal Vfb may be provided on line 140 to voltage regulator 92 which takes, in such alternative embodiment, the form of a closed-loop voltage regulator responsive to a difference between a desired supply voltage, such as slightly greater than ten volts d.c. and actual voltage Vfb, to controllably vary output signal Vreg in direction to drive such difference toward zero. The regulator is tuned in such alternative embodiment to take into account the voltage drop across ISBs 96 and 98, which voltage drop may be measured during a conventional circuit calibration process.

Returning to the preferred embodiment, signal Vdc is applied to voltage regulator circuit 100, such as a fixed twelve volt regulator, part no. LM7812, for outputting a drive signal to op-amp circuit elements as is generally understood in the art. The drive signal of the voltage regulator 100 is provided on line 104 to a conventional low pass filter circuit LPF 106 and on line 102 to a buffer filter circuit 108, to provide for drive signals for operation of such elements. Transducer reference signal Vref is passed through ISB 114 to line 116, which is tied to a ground plane to maintain the signal substantially at a ground reference level. Transducer output signal Vout is passed through ISB 112, to line 110 which is buffered via buffer filter 108 to minimize the voltage drop across ISB 112 to yield an accurate representation of signal Vout so that an accurate indication of the position of piston 34 of FIG. 1 may be maintained. The ISB 112, of a passive resistive type, avoids the switching frequency noise associated with the ISB circuitry conventionally recommended for high accuracy applications, yielding a low noise signal. The voltage drop introduced by such passive resistive ISB circuitry is minimized by minimizing the current therethrough, through addition of the high input impedance of the buffer filter 108. The buffer filter output signal is then passed through second order low pass filter LPF 106 for additional signal filtering, if necessary. The buffered, filtered transducer output signal is passed, on line 118, as output signal V+ to controller 70 (FIG. 1). The LPF 106 is selected as having a relatively light degree of filtering with minimum lag so that the filtered output thereof substantially reflects the actual position of the wiper 144 and therefore the piston 34 position during both steady state and transient operating conditions. The paint flow control sampling interval may then be decreased substantially without concern for signal corruption, supporting a more responsive paint flow control under all operating conditions.

Figure 3:
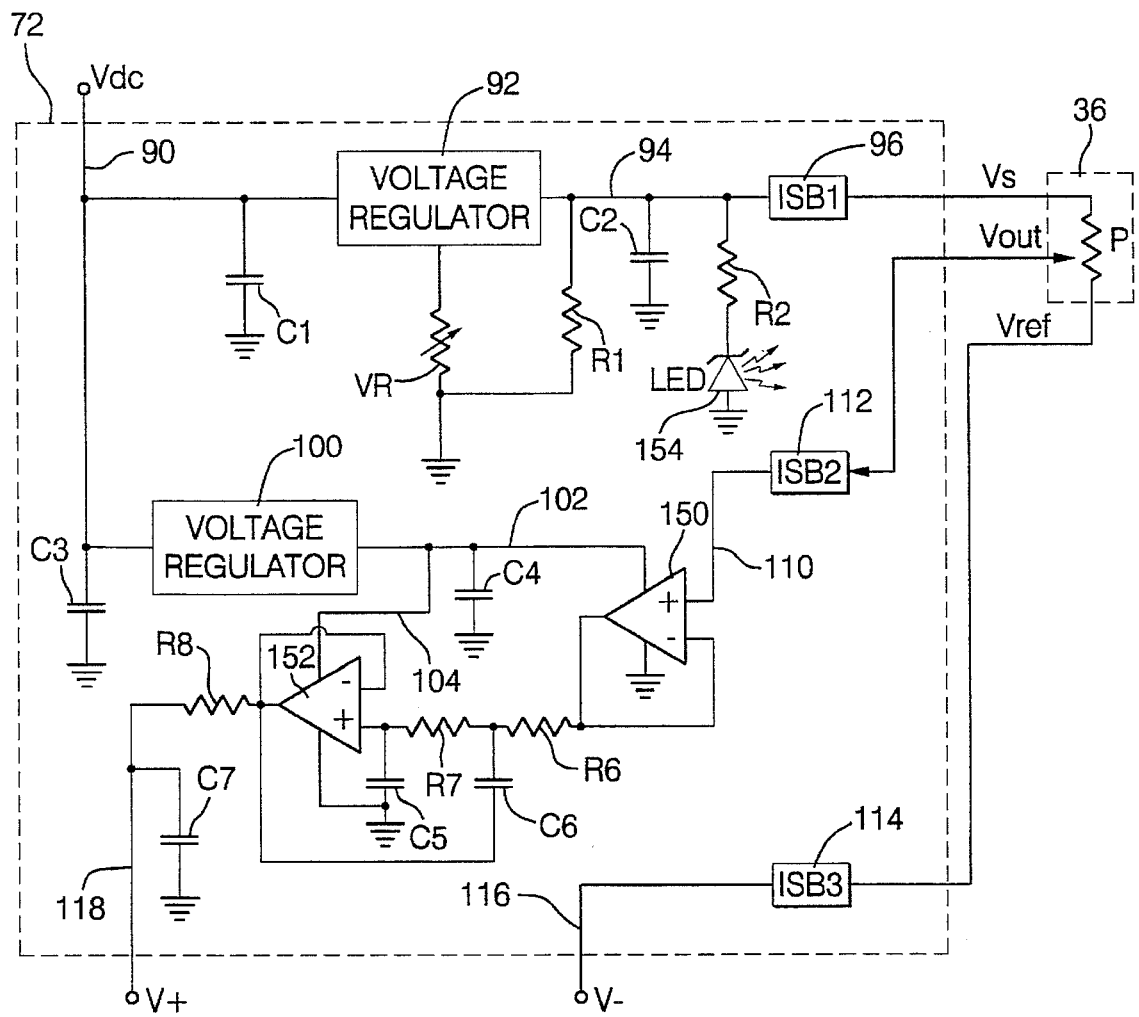
FIG. 3 is a schematic circuit diagram of a circuit implementation of the interface circuit in accord with the preferred embodiment.

Referring to FIG. 3, a specific implementation of the general circuitry of FIG. 2 is illustrated in accord with this embodiment including ISB elements 96, 112, and 114 for passing respective signals Vs, Vout, and Vref across the barrier into booth 10 (FIG. 1) from the described transducer 36. Input signal Vdc is provided as an input to voltage regulator 92 having variable setting defined by setting of conventional variable five kilohm resistive element VR with feedback resistor R1 of 220 ohms on regulator output line 94 to a high side of VR. Signal Vdc is pulled to a ground reference through tantalum decoupling ten microFarad capacitor C1. Regulator output on line 94 is passed to first terminal of ISB 96. Line 94 is pulled to a ground reference via tantalum decoupling ten microFarad capacitor C2. To indicate electrical energization of the circuit, conventional LED 154 is connected, through series resistor R2 of 4.7 kilohms, between line 94 and a ground reference. Signal Vdc is likewise applied as drive input to voltage regulator 100 for driving op-amp circuitry of FIG. 3. Regulator output line 102 is applied to drive input of op-amp 150 and of op-amp 152. Signal Vdc is pulled to a ground reference via tantalum decoupling ten microFarad capacitor C3 before application to voltage regulator 100. Likewise, regulator output line 102 is pulled to ground reference via tantalum decoupling ten microFarad capacitor C4. Single sided op-amp 150, part no. LM324AN, is configured in a well-known buffer filter circuit with output feedback to the inverting input terminal thereof, the voltage follower having substantial input impedance for decreasing current through ISB2 112, reducing the voltage drop thereacross to a negligible level, providing an ISB2 output signal on line 110 accurately representing Vout in accord with an important aspect of this invention. The ISB2 112 output on line 110 is connected to the high impedance, non-inverting input of op-amp 150, the buffered, filtered output of which is provided through series resistor R6 of 56 kilohms to low output impedance op-amp 152, part no. LM324AN, configured in a well-known second order low pass filter circuit, including series input 56 kilohm resistor R7 across which the voltage follower output passes to the non-inverting input of op amp 152. The non-inverting input is pulled to ground reference via 100 nanoFarad capacitor C5. The output of the op amp 152 is fed back to the inverting input thereof, and to the node between R6 and R7, via 100 nanoFarad capacitor C6. Such filter elements provide for a low pass filter of conventional construction having a cutoff frequency of about 28 Hz, with minimum lag between the input and the output signal thereof, in accord with a critical aspect of this interface circuit. The filter output signal is passed through series fifty ohm resistor R8 for signal current limiting, and is then pulled to ground reference via tantalum ten microFarad capacitor C7. The filter output signal is provided as signal V+ on output line 118 to controller 70 (FIG. 1).

The controller 70 periodically samples V+ to determine the change in volume of paint 32 in cylinder 31, which change in volume may be directly applied in a determination of actual paint flow rate. Such actual paint flow rate may be compared to a desired paint flow rate as may be calibrated through a conventional calibration process as ideal for the paint flow control application. Any flow control error may be controllably reduced toward zero for precision paint flow control in accord with this invention. Control responsiveness to change in control conditions is dramatically improved through light filtering, in hardware, of the piston position feedback signal Vout, made possible by the use of low noise circuit components. The resulting signal V+ may be relied on as an accurate representation of piston 34 (FIG. 1) position at all times during paint flow control operations and schemes to average, integrate, or otherwise condition the signal from the potentiometer 36 (FIG. 1) that introduce lag into the signal and increase the control sampling interval, may be eliminated in accord with a critical aspect of this invention.

Figure 5:
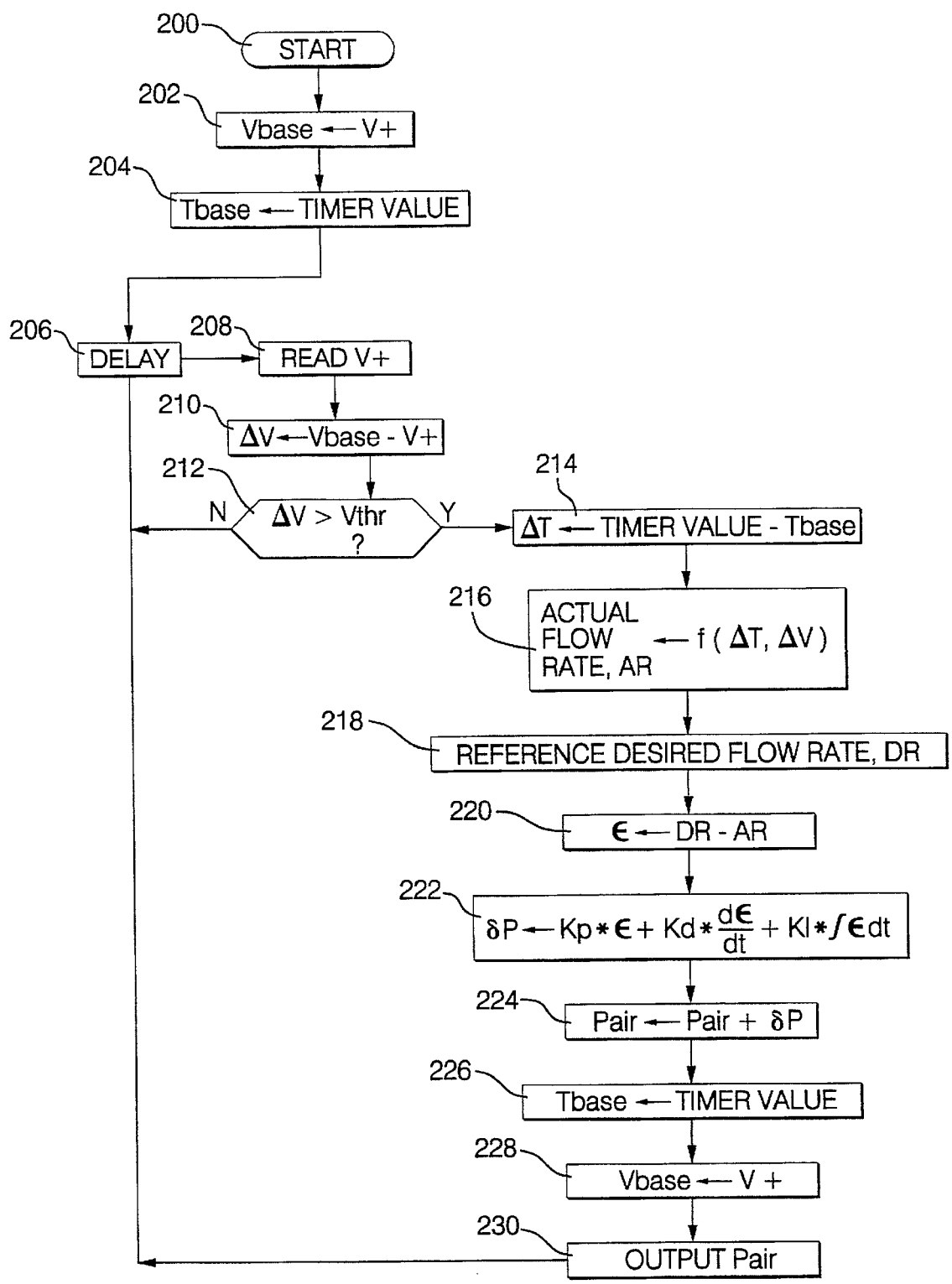
FIG. 5 is a flowchart depicting the control steps for the closed loop paint control system of the preferred embodiment.

More specifically, the controller 70 may periodically carry out a series of operations in the form on control steps or processes to provide for closed-loop paint flow control in this embodiment. Such series of operations are generally illustrated in FIG. 5, beginning at a step 200, which may be executed at the beginning of a paint flow control process, and which proceeds to a next step 202 to read the current value of signal V+, such as through a conventional analog to digital signal converter through which the signal V+ is received and translated to form usable by controller 70. The current V+ value is stored as an initial or base value as Vbase, for example in a conventional controller random access memory device (not shown). A current value of a controller free running timer is next stored at a step 204 in controller random access memory as an initial or base time value, Tbase. A delay period is next processed, such as approximately a twenty millisecond delay period at a step 206, upon the conclusion of which a next step 208 is executed to again read the current value of V+, to determined the degree of change in V+ away from the stored base or initial value, Vbase. The degree of change is next determined as ΔV at a step 210. If ΔV exceeds a threshold degree of change Vthr at a next step 212, wherein Vthr is pre-established as the change in V+ corresponding to between 2-5 cubic centimeters of paint flow, then the paint flow control operations of steps 214–230 are executed. If ΔV does not exceed Vthr at the step 212, then V+ may again be read at the step 208 or the delay of step 206 may again be processed at the step 206 before again reading the current value of V+.

Returning to step 212, if ΔV exceeds Vthr, then a change in time ΔT is determined at the step 214 as the difference between the current value of the controller 70 timer and the stored Tbase value, wherein ΔT represents the amount of time required for ΔV to exceed Vthr corresponding to the amount of time required for the paint flow control system to pass from two to five cubic centimeters of paint out of cylinder 31 (FIG. 1). The actual flow rate (AR) is then determined at a next step 216 as a function of ΔT and ΔV, for example as the quotient of ΔV/ΔT.

A desired flow rate DR is next referenced at a step 218 from a conventional read only memory device (not shown) in controller 70 which is assigned a predetermined flow rate value, for example determined during a conventional paint flow control system calibration process. A paint flow rate error E is next determined at a step 220 as a difference between Dr and AR, and a control command change δP is then determined as a function of E at a step 222, for example in accord with a proportional-plus-derivative-plus-integral control function as illustrated in FIG. 5 having calibrated control gains Kp, Kd, and KI, as generally understood in the art. The command change δP is, in this embodiment, determined as the change in air pressure applied to the flow regulator 40 (FIG. 1) necessary to vary the position of the diaphragm thereof so as to provide for a change in paint flow therethrough to conduit 42 and to applicator end assembly 44 to drive paint flow rate in direction to minimize the error E thereof. The small time lag introduced by the circuitry of the interface circuit 70, due to the selection of the passive resistive ISB circuit of this embodiment in contradiction to the teachings and general requirements of the art, eliminates a source of great noise in the electrical circuitry of the paint flow control system, allowing for much lighter filtering with minimum filter lag and for responsive feedback information so that the control process of FIG. 5 may provide the highly responsive control required for accurate metering of paint to automotive parts in accord with this invention. Following determination of δP at the step 222, the air pressure command Pair applied to flow control transducer 58 of FIG. 1 is updated with δP at a next step 224. The base time and voltage values, Tbase and Vbase, respectively, are next updated at the respective steps 226 and 228 by storing the current values of the timer and V+, respectively, thereto. The updated command Pair is next output at a step 230 to the flow control transducer 58 of FIG. 1 for paint flow rate control adjustment responsive to the accurate, low noise feedback signal V+ having minimum signal lag, in accord with this invention. Following the step 230, the described delay step 206 is executed to delay approximately twenty milliseconds, as described, before the next iteration of the steps 208–230. the process of repeating the steps 206–230 continues during the paint flow control process to provide for accurate, responsive closed-loop paint flow rate control in accord with this embodiment.

The preferred embodiment for the purpose of explaining this invention is not to be taken as limiting or restricting this invention since many modifications may be made through the exercise of ordinary skill in the art without departing from the scope of this invention.

The embodiments of the invention in which a property or privilege is claimed are described as follows:

1. In a paint flow control system including a controller outside a paint booth and an applicator and transducer within the paint booth, the controller for issuing a paint flow control command for controlling paint flow to the applicator in response to a transducer output signal indicating a predetermined paint flow parameter, an interface circuit for passing electrical signals into and out of the paint booth, comprising:

a passive resistive intrinsically safe barrier element (ISB) having an input terminal electrically connected to a transducer output terminal for receiving the transducer output signal and having an output terminal; and a buffer having an input terminal electrically connected to the ISB output terminal and having an output terminal, the buffer for minimizing voltage drop of the transducer output signal across the interface circuit;

the buffer output terminal providing an output signal for application to the controller for paint flow control.

2. The interface circuit of claim 1, wherein the transducer is a potentiometer having a supply terminal, a reference terminal, and the output terminal, the interface circuit further comprising:

a voltage regulator for generating a regulated supply voltage signal;

a supply voltage signal intrinsically safe barrier element (ISBs) having an input terminal connected to the voltage regulator for receiving the supply voltage signal and having an output terminal electrically connected to the supply terminal of the potentiometer;

a reference voltage signal terminal; and a reference voltage signal intrinsically safe barrier element (ISBr) having an input terminal electrically connected to the reference voltage signal terminal and having an output terminal electrically connected to the reference terminal of the potentiometer.

3. The interface circuit of claim 2, wherein the ISBs and ISBr are passive resistive intrinsically safe barrier elements.

4. The interface circuit of claim 3, wherein each passive resistive intrinsically safe barrier element comprises:

a signal conductor between the input and the output terminals of such element;

an electrical resistor connected in series with the signal conductor between the input and the output terminals of such element; and at least one Zener diode having a first terminal and a second terminal, the first terminal electrically connected to the signal conductor between the input and the output terminals of such element and the second terminal electrically connected to a ground reference.

5. The interface circuit of claim 4, wherein each passive resistive intrinsically safe barrier element further comprises a fuse connected in series with the signal conductor between the input and the output terminals of such element.

6. The interface circuit of claim 2, wherein the voltage regulator is a closed-loop voltage regulator for generating the regulated supply voltage signal in response to a feedback signal applied to a feedback terminal of the closed-loop voltage regulator, the interface circuit further comprising:

a feedback signal intrinsically safe barrier element (ISBf) having an input terminal electrically connected to the supply terminal of the potentiometer and having an output terminal electrically connected to the closed-loop voltage regulator feedback terminal.

7. The interface circuit of claim 6, wherein the ISBf is a passive resistive intrinsically safe barrier element.

8. The interface circuit of claim 1, further comprising:

a low pass filter element having a predetermined short time constant, having an input terminal electrically connected to the buffer output terminal, and having an output terminal electrically connected to a controller input port for providing a low pass filtered, buffered transducer output signal indicating the flow parameter signal value.

9. The interface circuit of claim 1, the controller having a memory device for storing a value indicating a desired paint flow rate, and wherein the controller varies the paint flow control command as a predetermined function of a difference between the desired paint flow rate and the buffer output signal.

10. The interface circuit of claim 1, wherein the buffer comprises a high input impedance voltage follower circuit element.

11. The interface circuit of claim 1, wherein the ISB includes a series resistance, and wherein the buffer comprises buffer amplifier circuitry for amplifying the buffer output signal to restore a voltage drop across the ISB series resistance.

* * * * *